United States Patent [19]

Johnson et al.

[11] Patent Number: 4,744,499
[45] Date of Patent: May 17, 1988

[54] SYSTEM FOR AUTOMATED MANUFACTURE OF PRESSURE VESSELS

[75] Inventors: Daniel D. Johnson; Robert L. Johnson, both of Tulsa, Okla.

[73] Assignee: Lecco, Inc., Tulsa, Okla.

[21] Appl. No.: 904,549

[22] Filed: Sep. 8, 1986

[51] Int. Cl.$^4$ .............................................. B23K 31/02
[52] U.S. Cl. ..................................... 228/4.1; 228/184
[58] Field of Search ..................... 43/7, 184; 29/33 K, 29/33 P, 424, 430, 563; 901/42; 228/4.1, 7, 184

[56] References Cited

U.S. PATENT DOCUMENTS

| | | | |
|---|---|---|---|
| 1,655,931 | 1/1928 | Langstroth | 228/184 |
| 2,645,475 | 7/1953 | Garrison | 228/7 |
| 3,559,256 | 2/1971 | Lemelson | 29/33 P |
| 3,946,484 | 3/1976 | Aronstein et al. | 29/563 |
| 4,030,617 | 6/1977 | Richter | 901/42 |
| 4,371,108 | 2/1983 | Roggendorff et al. | 29/430 |

FOREIGN PATENT DOCUMENTS 2143762  1/1985  United Kingdom ................. 901/42

Primary Examiner—M. Jordan
Attorney, Agent, or Firm—Head & Johnson

[57] ABSTRACT

A system for automated manufacture of a pressure vessel, the system including a cutting station at which an elongated cylinder is cut into a selected length forming the vessel shell, a first, second and third computer control shell indexing station, each indexing station having means to rotate the shell about its horizontal axis in response to computer control, a computer control multi-axes arm robot having means to grasp and manipulate a cutting torch and a welding torch, the robot moving to the first index station to cut holes in the shell at preselected locations and, at the second indexing station for welding piping fittings in the shell having holes cut therein, and at the third indexing station for welding a head on each end of the shell to close the vessel. In the preferred arrangement the robot is mounted on a track which runs parallel to the first, second and third indexing stations.

2 Claims, 5 Drawing Sheets

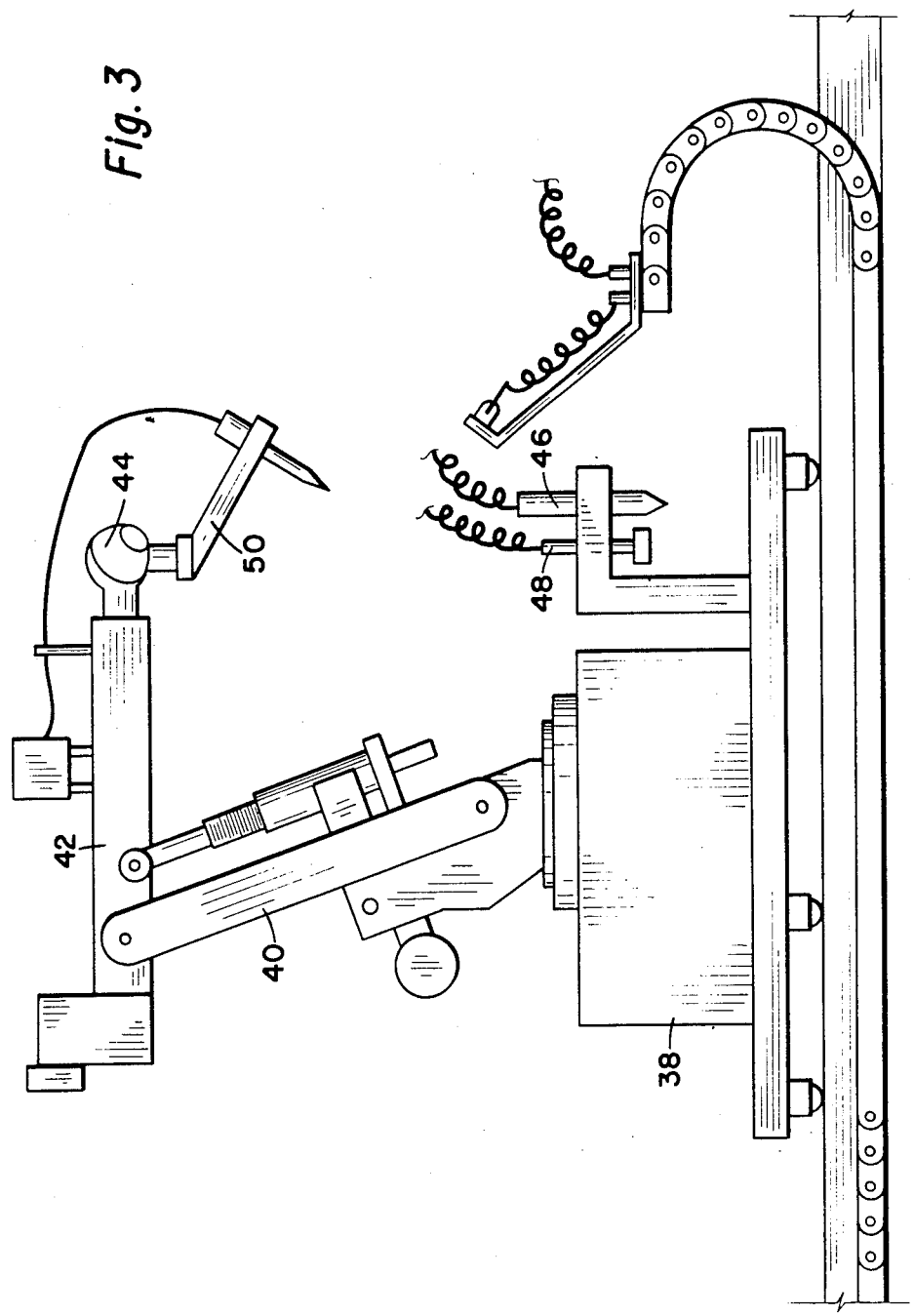

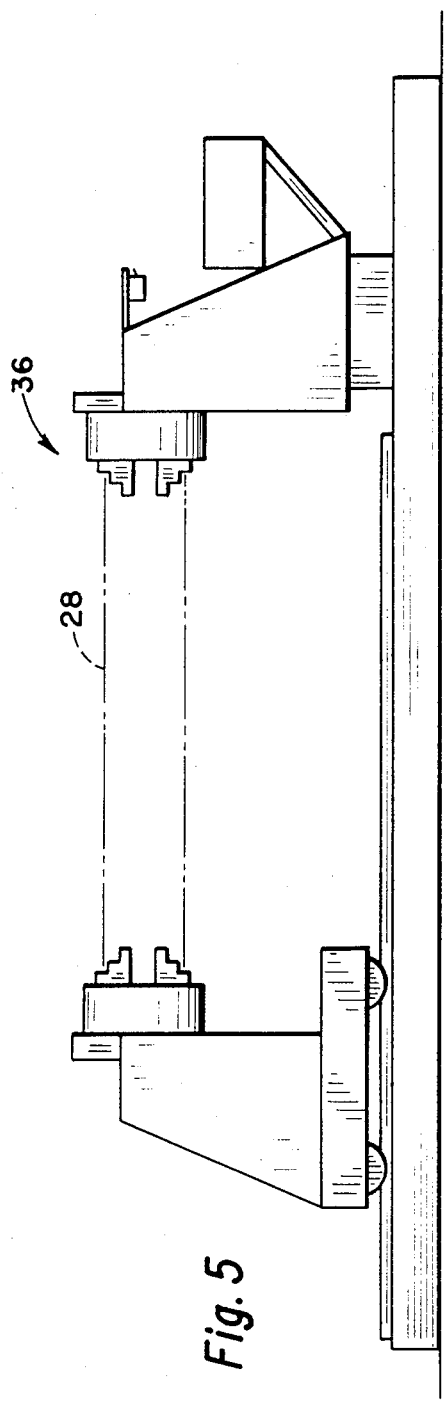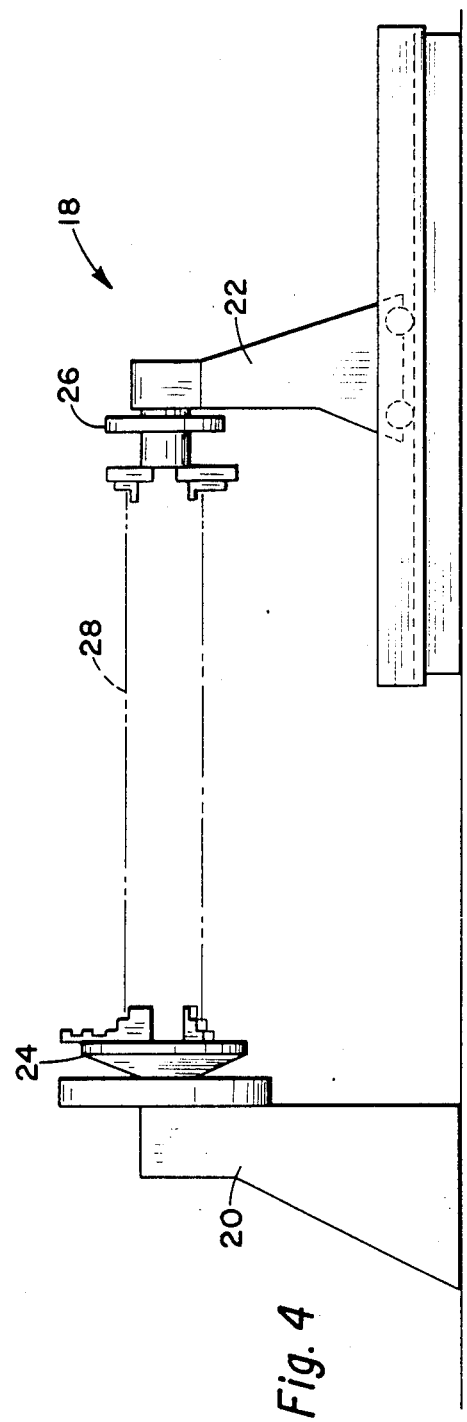

4,744,499

SYSTEM FOR AUTOMATED MANUFACTURE OF PRESSURE VESSELS

SUMMARY OF THE INVENTION

Many pressure vessels of varying diameters and lengths are employed in industry. In the petroleum industry, as an example, pressure vessels are utilized for separating water from gas and water from oil in a variety of arrangements. These pressure vessels have, up to the present time, been manufactured manually. That is, the shell of the vessel which is typically cylindrical is either cut from a length of tubular stock having the appropriate diameter, or the shell is rolled from a sheet of steel. The cylindrical shell is then ready for fixing the piping necessary to complete the vessel. This is accomplished by first manually cutting holes in the cylindrical wall of the vessel shell. To accomplish this each hole must be manually longitudinally and rotationally positioned. Thereafter, a chalk outline of the hole is drawn on the shell and a welder, following the chalk outline, using a manually controlled welding torch, cuts each hole in the vessel. It is obvious that manually locating each hole to be cut in the vessel in exceedingly time consuming and fraught with the possibilities of mistake. In addition, since the holes are manually cut it is difficult to maintain good quality control of this procedure.

After the holes are cut manually piping fittings are then manually positioned at the holes and a welder welds the fittings to the shell.

Finally, heads are welded on each end of the shell to close the vessel.

All of these procedures are, at the present time, accomplished manually and it is apparent that they are therefore very time consuming, with a high error possibility, and with quality control being very difficult.

The present invention is directed towards a method of manufacturing pressure vessels in an automated arrangement wherein the vessels are completed with a high degree of uniformity and consistent quality control.

The system includes a cutting station axially horizontally receiving a portion of an elongated length of cylindrical stock. At the cutting station the cylinder is cut into the length of the shell of the vessel to be formed. The cutting station is preferably arranged with rollers so that as each shell is cut the cylindrical stock may be axially advanced to allow sequential shells to be cut from it, all of the cutting taking place at the same location.

A first computer control shell indexing station is employed having means to rotate the shell about its horizontal cylindrical axis. After the shell has been cut at the cutting station it is moved and secured to the indexing station. A computer controlled, multi-axes arm robot is employed, the robot having means to grasp and manipulate either a cutting torch or a welding torch.

At the first shell indexing station the robot, utilizing a cutting torch, and utilizing computer controlled positional instructions to both the robot and to the indexing station, cuts all of the holes necessary in the cylindrical wall of the shell.

Thereafter, the shell is moved to a second computer control shell indexing station having means to rotate the shell about its horizontal axis. At the second indexing station piping components are positioned in engagement with the shell at the openings which have been cut therein. The robot, utilizing a welding torch, is controlled by computer to weld the piping components to the shell.

A third computer control shell indexing station has like the first and second stations, means to rotate the shell about its horizontal cylindrical axis. At the third station, heads are positioned in engagement with each end of the cylindrical shell and the robot, utilizing a welding torch, controlled by computer, in conjunction with the computer control of the third indexing station, to weld the heads on the shell, closing each end thereof.

The pressure vessel is thus completed by a system in which all of the cutting and welding is accomplished by computer controlled robot and indexing stations. The shell may be moved by an operator from station to station as by utilizing an overhead crane. After being secured in each station the cutting and welding requirements are carried on automatically employing a computer program applicable for the specific requirements of each pressure vessel being manufactured.

The invention will be better understood with reference to the following description of the preferred embodiment and the claims, taken in conjunction with the attached drawings.

DESCRIPTION OF THE DRAWINGS

FIG. 3 is an elevational view of the computer controlled robot as utilized to practice the invention, the robot being shown mounted on a track.

FIG. 4 is an elevational view of the first computer controlled indexing station. The second indexing station if of like elevational view.

FIG. 5 is an elevational view of the third indexing station.

DESCRIPTION OF THE PREFERRED EMBODIMENT

Figure 1:
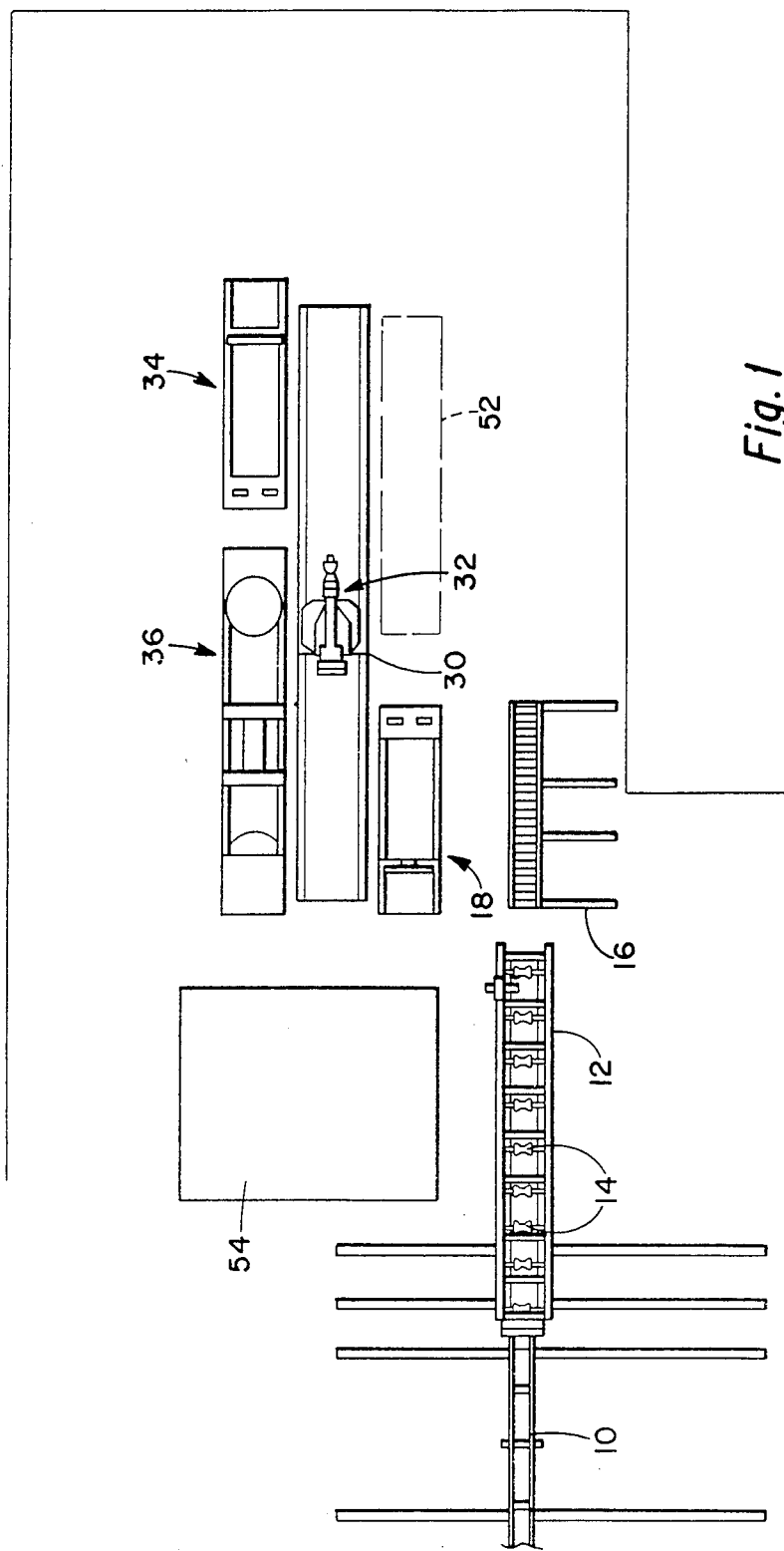
FIG. 1 is a plan view of the layout of equipment necessary to practice the system of this invention.

Referring to the drawings and first to FIG. 1 a plan layout of the system for practicing the invention is shown. A pressure vessel is formed, according to the system, from a length of cylindrical stock, which may, for smaller diameter vessels be in the form of large diameter pipe. The cylindrical stock (not shown) is axially advanced on a track 10 to a cutting station 12. Rollers 14 at the cutting station aid in the accurate longitudinal positioning of the cylindrical stock. At cutting station 12 a length is cut from the end of the pipe, the length being accurately defined and the cut portion forms the shell of the vessel to be manufactured. After each shell is cut it is moved to a cut shell storage 16. The cylindrical shells form the basic portion and the main body structure of the pressure vessel to be formed.

From the cut shell storage 16 a shell is moved to a first computer control shell indexing station 18, seen in elevational view in FIG. 4. The indexing station has a fixed support 20 at one end and a movable support 22 at the other. Supports 20 and 22 have a rotational indexing head 24 and 26, respectively. The first indexing head 24 is rotationally controlled by computer as will be herein-after explained in greater detail while the second indexing head 26 is free and responds to the rotational positions selected by the first indexing head when a shell, indicated in dotted outline and identified by numeral 28, is positioned between the heads.

Mounted on a track 30 is a computer controlled multiple-axes arm robot generally indicated by the numeral 32. While the robot may be of a variety of types, a type which has functioned successfully in the practice of a system of this invention may be the type such as the Cincinnati Milacron T3746/776 industrial robot. This robot is electrically driven and computer controlled. It has an arm and can control positioning of a tool, such as a welding torch or cutting torch, about six axes. The robot includes a three roll wrist providing the flexibility and rigidity necessary to perform cutting and welding operations.

At the first indexing station 18 the robot 32, utilizing a cutting torch, and controlled by computer, in conjunction with the computer control of the indexing head 24, cuts holes in the wall of the cylindrical shell 28 as required for each particular design of pressure vessel being fabricated. The indexing head 24 is rotated in conjunction with the manipulation of the cutting torch by the robot so as to accurately and precisely cut to prescribed tolerances each hole required in the vessel wall.

After the holes as required have been cut, the shell is moved to a second computer controlled indexing station 34 which has an elevational appearance and function as has been described with reference to the first indexing station 18 as seen in FIG. 4. At the second indexing station 34 piping elements, such as collars, flanges, short length of pipe, etc., as are necessary for the vessel, are welded into position on the vessel shell at the holes which have been cut in the vessel shell at the first indexing station 18. For this function the robot 32 hangs up the cutting torch as used at the first indexing station 18 and picks up a welding torch. By computer control the piping elements are welded to the vessel by the coordinated action of the robot and the rotational positioning of the shell by the indexing head at the second indexing station.

After the piping fittings have been welded to the shell of the vessel at indexing station 42 the vessel shell is moved to a third indexing station 36, an elevational view of which is seen in FIG. 5. At the third indexing station 36 the heads are welded on the ends of the shell 28 to close the vessel. The pressure vessel has, at this stage been completely formed, starting with a length of cylindrical stock. The robot 32 moves from each indexing station in sequence, as controlled by computer and by an operator. At each indexing station the cutting and welding operations take place by the coordinated computer controlled action of the indexing heads and the robot.

The shell may be moved from one position to another by an operator such as by use of an overhead crane (not shown) or by the use of forklifts or other handling equipment (not shown) so that none of the movement requires manual lifting of the vessel shell.

Figure 2:
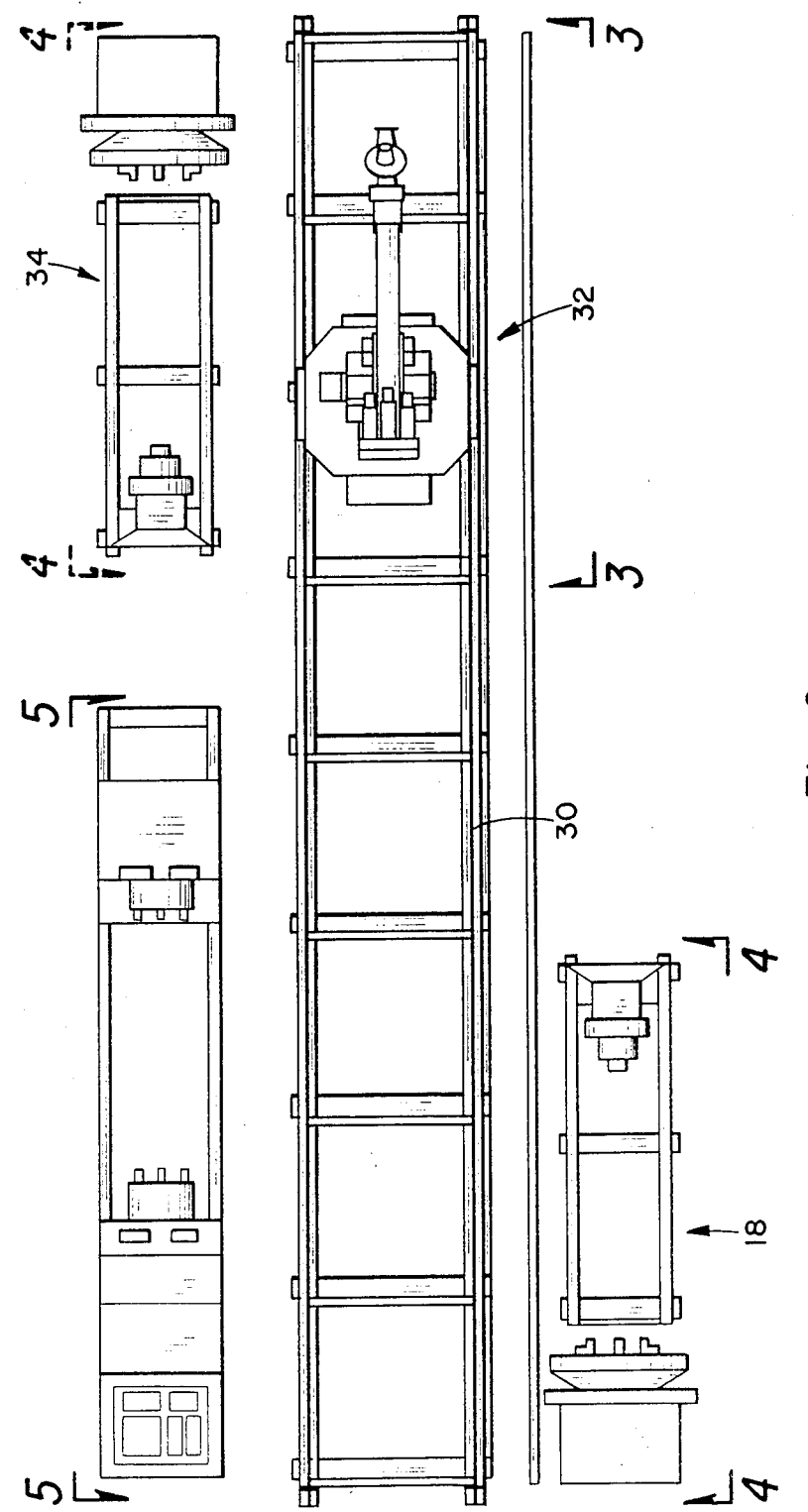
FIG. 2 is an enlarged view of a portion of the layout of FIG. 1 showing the relationship of the major components of the system.
Figure 7:
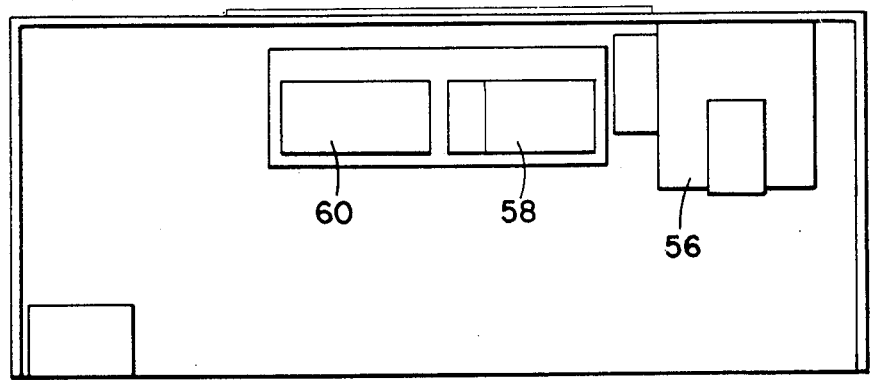
FIG. 7 is an enlarged plan view of the control room as employed in practicing the system of the invention.
Figure 6:
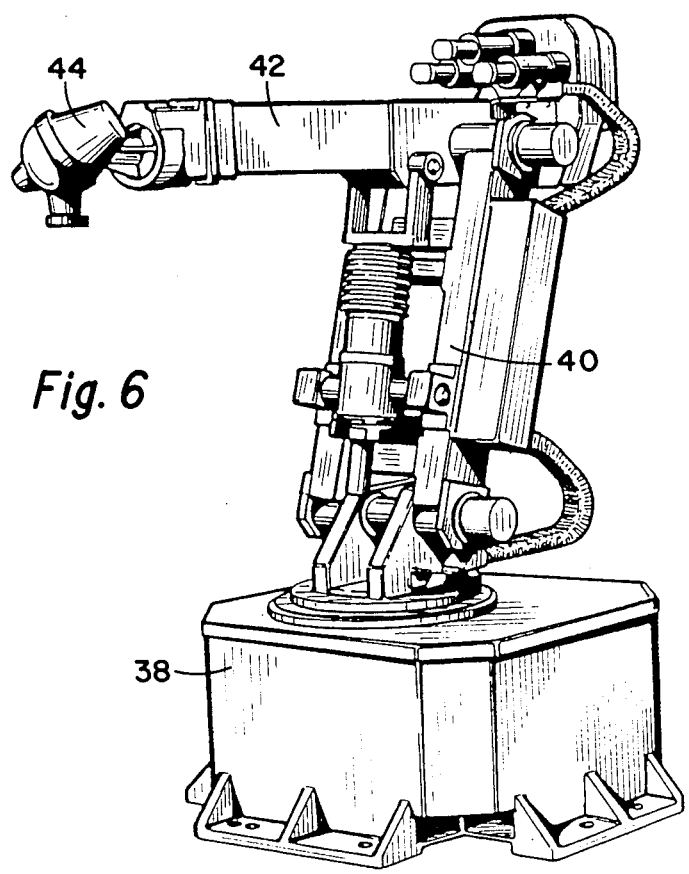
FIG. 6 is an isometric view of the robot as employed in the invention.

The robot as best seen in FIGS. 3 and 6 includes a base 38 with arms 40 and 42 and with a wrist element 44. As seen in FIG. 2, provision is made for holding a cutting torch 46 and a welding torch 48. The robot has grasping means 50 by which either torch 46 or 48 is grasped. In a typical application the cutting torch 46 will be supplied with gas and oxygen whereas the welding torch 48 is supplied with electrical energy and in some applications with electrical energy as well as an inert gas.

As seen in FIG. 1, an additional indexing station may be utilized as necessary at the location identified by the numeral 52 when the complexity of a vessel design requires the utilization of an additional functioning station.

A control room 54 houses the control electrical equipment. The control room includes the electronic robotic control system 56 which is in turn controlled by a computer 58 employing information supplied from disc, tapes or the like, and a programmable control unit 60. A welding power supply is provided at 62. Other control and information supply systems can be employed in the control room—only the basic control systems being illustrated.

The invention provides a unique system for the automated manufacture of pressure vessels as employed typically in the process industry, but the system may be employed for other similar applications wherein items are manufactured from cylindrical shells.

While the invention has been described with a certain degree of particularity it is manifest that many changes may be made in the details of construction and the arrangement of components without departing from the spirit and scope of this disclosure. It is understood that the invention is not limited to the embodiments set forth herein for purposes of exemplification, but is to be limited only by the scope of the attached claim or claims, including the full range of equivalency to which each element thereof is entitled.

What is claimed is:

1. A system for the automated manufacture of a pressure vessel having a shell formed from an elongated length of cylindrical stock, comprising:

a cutting station having means for axially horizontally receiving a portion of an elongated length of cylindrical stock thereon;

means to cut said elongated length of cylindrical stock to a preselected length at said cutting station to form the vessel shell;

a first computer controlled shell indexing station having means to rotate said shell about its horizontal cylindrical axis;

a computer controlled, multi-axes, arm robot, the robot having means to grasp and manipulate a cutting torch and a welding torch;

means to cut piping holes at preselected rotational and lonitudinal locations in said shell by the simultaneous positional controls of said robot and said first shell indexing station;

a second computer controlled shell indexing station having means to rotate said shell about its horizontal cylindrical axis;

means at said second indexing station to sequentially position piping components in engagement with said shell at piping holes cut in said shell;

means to control said robot and said second shell indexing station to weld piping components to said shell;

a third computer controlled shell indexing station having means to rotate said shell about its horizontal cylindrical axis; and means to control said robot and said third shell indexing station to weld heads onto said shell to close the ends thereof, said robot moving from said first, second and third indexing station in response to operator and computer controls, said shell being moved from said cutting station to said first, second and third indexing station in response to operator control.

2. A system for automated manufacture of a pressure vessel according to claim 1 including:

a track having said robot thereon, the track running parallel said first, second and third indexing stations; and means to move said robot on said track in response to operator and computer control.

* * * * *